(12) United States Patent
Osaki

(10) Patent No.: US 7,651,592 B2
(45) Date of Patent: Jan. 26, 2010

(54) MOLDED ARTICLE

(75) Inventor: Masayuki Osaki, Tochigi (JP)

(73) Assignee: KAO Corporation, Tokyo (JP)

( * ) Notice: Subject to any disclaimer, the term of this patent is extended or adjusted under 35 U.S.C. 154(b) by 110 days.

(21) Appl. No.: 11/579,955

(22) PCT Filed: May 17, 2006

(86) PCT No.: PCT/JP2006/009822

§ 371 (c)(1),
(2), (4) Date: Nov. 9, 2006

(87) PCT Pub. No.: WO2006/123695

PCT Pub. Date: Nov. 23, 2006

(65) Prior Publication Data

US 2008/0026093 A1    Jan. 31, 2008

(30) Foreign Application Priority Data

May 20, 2005  (JP)  ............................ 2005-148746
May 15, 2006  (JP)  ............................ 2006-135719

(51) Int. Cl.
*D21F 1/00* (2006.01)
(52) U.S. Cl. .................................................... 162/218
(58) Field of Classification Search ................. 162/218; 425/470; 264/319
See application file for complete search history.

(56) References Cited

U.S. PATENT DOCUMENTS

2004/0011489 A1  1/2004  Kimbara et al.
2004/0069429 A1  4/2004  Tsuura et al.
2007/0225449 A1 *  9/2007  Kanae et al. ............. 525/333.7

FOREIGN PATENT DOCUMENTS

| EP | 1384569 A1 | 1/2004 |
|---|---|---|
| EP | 1806454 A1 | 7/2007 |
| JP | 53-48026 A | 5/1978 |
| JP | 58-68446 A | 4/1983 |
| JP | 60-191630 A | 9/1985 |
| JP | 63-120151 A | 5/1988 |
| JP | 4-147742 A | 5/1992 |
| JP | 5-353 A | 1/1993 |
| JP | 8-192244 A | 7/1996 |
| JP | 9-253792 A | 9/1997 |
| JP | 10-5931 A | 1/1998 |
| JP | 2000-34695 A | 2/2000 |
| JP | 2002-201736 A | 7/2002 |
| JP | 2004-181472 A | 7/2004 |
| JP | 2004-195547 A | 7/2004 |
| WO | WO 2005/040236 * | 5/2005 |

OTHER PUBLICATIONS

Japanese Office Action with English Translation, JP2006-135719, Nov. 17, 2009, 4 pages.

* cited by examiner

*Primary Examiner*—Mark Halpern
(74) *Attorney, Agent, or Firm*—Birch, Stewart, Kolasch & Birch, LLP

(57) ABSTRACT

A molded article contains inorganic powder as a main component and further contains inorganic fiber, organic fiber, a thermosetting resin, and heat expandable particles, the heat expandable particles being present in an amount of 0.5% to 10% by mass based on the total mass of the inorganic powder, the inorganic fiber, the organic fiber, the thermosetting resin, and the heat expandable particles. The inorganic powder is preferably graphite. The inorganic fiber is preferably carbon fiber. The organic fiber is preferably pulp fiber. The thermosetting resin is preferably a phenol resin.

7 Claims, 7 Drawing Sheets

MOLDED ARTICLE

This application is a 371 of PCT/JP2006/309822 filed on 17 May 2006.

TECHNICAL FIELD

The present invention relates to a molded article made mainly of inorganic powder and a method of producing the same. In particular, it relates to a molded article suited for use as a mold for producing a casting or a structure (hereinafter inclusively referred to as a casting mold, etc.) and a method of producing the same.

BACKGROUND ART

In general production of castings, a casting mold with a cavity is created out of casting sand from a pattern made of wood, metal, etc., molten metal is poured in the cavity, and, after cooling, a cast product is taken out of the mold.

Making a wooden or metal pattern requires skill and expensive equipment. Such a pattern is expensive and heavy and, moreover, gives rise to a disposal problem and is therefore unsuited to the production of castings except mass-produced items. Because a mold of sand is prepared by hardening casting sand that is a mixture of common sand and a binder, sand reclamation is needed in reusing the sand. Sand reclamation is accompanied by generation of waste such as dust.

To address these problems, Applicant made a proposal in JP-A-2004-181472, in which a casting mold, etc. are formed of molded articles containing organic fiber, inorganic fiber, and a thermosetting resin. The molded article by the proposed technique is thinner, lighter, and more processable than conventional sand molds and involves no problem of waste generation. Depending on the design, some castings have complicated shapes and are required to achieve precision in detail. There has still been a demand for a molded article that can be applied to the manufacture of such castings.

DISCLOSURE OF THE INVENTION

In the light of the above-described problems, an object of the present invention is to provide a molded article with which a casting material is shaped into a complicated configuration with precision in detail and a method of producing the molded article.

The present invention accomplishes the above object by the provision of a molded article containing inorganic powder as a main component and further contains inorganic fiber, organic fiber, a thermosetting resin, and heat expandable particles. The molded article contains the heat expandable particles in an amount of 0.5% to 10% by mass based on the total mass of the inorganic powder, inorganic fiber, organic fiber, thermosetting resin, and heat expandable particles.

The present invention also provides a method of producing the molded article of the invention, including the steps of preparing a stock slurry by dispersing the inorganic powder, the inorganic fiber, the organic fiber, the thermosetting resin, and heat expandable particles in a dispersing medium, forming a wet preform from the slurry by a papermaking process, and drying the preform by heating in a mold to shape the preform while expanding the heat expandable particles.

The present invention provides a molded article with detailed precision however complicated the shape may be and a method of producing the molded article.

BRIEF DESCRIPTION OF THE DRAWINGS

FIG. 10(*b*) illustrates exemplary molded articles produced by the method of producing a molded article according to the present invention and represents an enlarged view of edges of the two molded articles mated together.

BEST MODE FOR CARRYING OUT THE INVENTION

Figure 1:
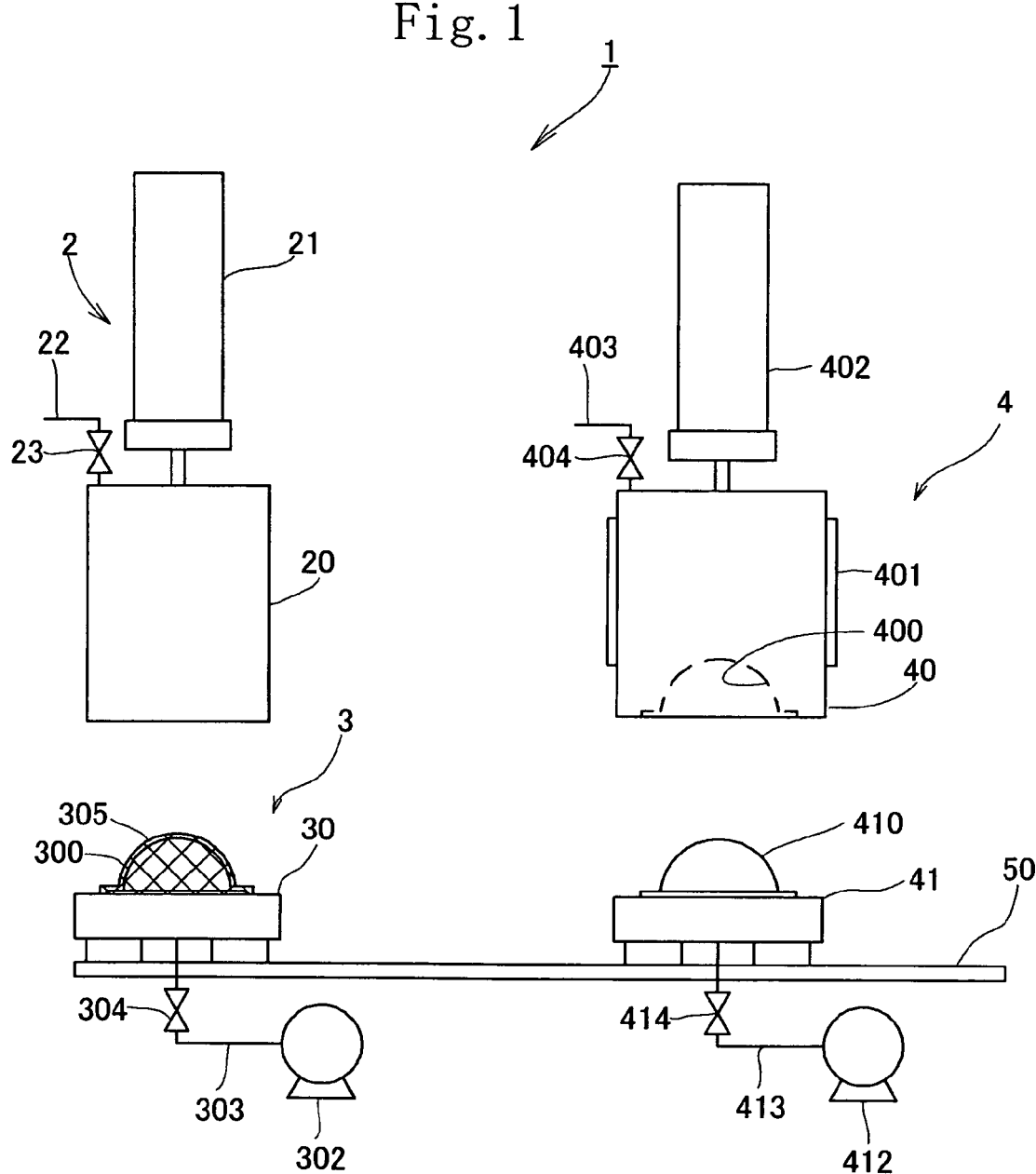
FIG. 1 is a partial cross-section schematically showing an embodiment of apparatus for carrying out the method of producing a molded article according to the present invention.

The present invention will be described based on its preferred embodiments.

The present invention is basically described with respect to an embodiment in which the molded article of the invention is applied to a casting mold, etc.

The molded article of the present embodiment contains inorganic powder as a main component and further contains inorganic fiber, organic fiber, a thermosetting resin, and heat expandable particles. The phrase "as a main component" means that the inorganic powder forms a largest proportion by mass in the molded article.

The molded article of the present embodiment preferably contains 0.5% to 10%, more preferably 2% to 8%, (by mass) of the heat expandable particles based on the total mass of the inorganic powder, inorganic fiber, organic fiber, thermosetting resin, and heat expandable particles. The content of the heat expandable particles being in that range, a sufficient effect of addition is produced while minimizing adverse influences of expansion on molding precision. As a result, the inner configuration of a papermaking mold is faithfully transferred to a molded article in detail. Even when the papermaking mold is complicatedly shaped, papermaking (formation of a preform) can be achieved with good precision in every detail without causing cracks or tears. This is because heat expandable particles expand to press the papermaking material onto every corner of the papermaking mold. Due to the limited amount of the heat expandable particles, over-expansion is prevented, no extra cooling time is needed, and thus high productivity is maintained.

The molded article of the invention contains heat expandable particles in their heat expanded state. The average diameter of the particles before heat expansion is preferably 5 to 80 mm, more preferably 20 to 50 mm. The average diameter of the expandable particles falling within that range, a sufficient effect of addition is secured while minimizing adverse influences of expansion on molding precision.

In the molded article of the invention, the compounding ratio (by mass) of inorganic powder/inorganic fiber/organic fiber/thermosetting resin/heat expandable particles is preferably 70 to 80/2 to 6/2 to 10/8 to 16/0.5 to 10, more preferably 70 to 80/2 to 8/2 to 6/10 to 14/2 to 8, taking the total of the inorganic powder, inorganic fiber, organic fiber, thermosetting resin, and heat expandable particles as 100 by mass.

The recited proportion of the inorganic powder provides satisfactory shape retention during a pour, satisfactory surface properties of a molded article, and easy release of a molded article from a mold after shaping. The expanding force of the heat expandable particles and the adjusted binding force, in synergistic cooperation with each other, facilitate movement of the components such as the inorganic and organic fibers. As a result, the configuration of a shaping mold is transferred to a molded article more faithfully.

The recited proportion of the inorganic fiber provides satisfactory moldability and shape retention during a pour. The recited proportion of the organic fiber provides satisfactory moldability while minimizing gas generation and belch of flame from a flow-off during a pour. The recited proportion of the thermosetting resin provides satisfactory moldability, shape retention during a pour, and surface smoothness.

The inorganic powder includes graphite, such as tabular graphite (scaly graphite) or earthy graphite, obsidian, mica, mullite, silica, and magnesia. One or more than one kind of these inorganic powders can be selected for use. Graphite, particularly tabular graphite (scaly graphite), is preferred in view of moldability and cost.

The inorganic fiber serves mainly to constitute the skeleton of the molded article. On pouring molten metal, it does not burn with the heat of the molten metal and continues serving to retain the shape of the molded article. The inorganic fiber includes carbon fiber, artificial mineral fibers such as rock wool, ceramic fibers, and natural mineral fibers. They can be used either alone or in combination of two or more thereof. Carbon fiber that maintains high strength even in high temperatures, such as pitch-based carbon fiber or polyacrylonitrile (PAN)-based carbon fiber, is preferred for reducing thermal shrinkage accompanying carbonization of the thermosetting resin. PAN-based carbon fiber is especially preferred.

The inorganic fiber preferably has an average length of 0.5 to 15 mm, more preferably 1 to 8 mm, from the standpoint of good drainage in dewatering a preform (a precursor of a casting mold, etc.) formed by a papermaking process, moldability to obtain a casting mold, etc., and uniformity of the resulting casting mold, etc.

The organic fiber includes paper fibers (pulp fibers), fibrillated synthetic fibers, and regenerated fibers (e.g., rayon fiber). These fibers are used either individually or as a mixture of two or more thereof. Preferred of them are paper fibers from the viewpoint of molding properties, strength after drying, and cost.

The paper fibers include not only wood pulp but non-wood pulp, such as cotton pulp, linter pulp, bamboo, and straw. These kinds of pulp, whether virgin or recycled, can be used either alone or in combination thereof. From the standpoint of ease and stability of supply, environmental conservation, and reduction of production cost, used paper pulp is preferred.

It is preferred for the organic fiber to have an average length of 0.8 to 2.0 mm, more preferably 0.9 to 1.8 mm, from the viewpoint of molding properties, surface smoothness, and impact strength of the resulting molded article.

The thermosetting resin is a component necessary to retain the low- and high-temperature strength of a molded article and to provide a molded article with good surface properties, which contribute to improve the surface smoothness of a casting when the molded article is used as a casting mold. The thermosetting resins include phenol resins, epoxy resins, and furan resins. Phenol resins are preferred of them in view of reduced generation of combustible gas, which is effective to suppress burning. Moreover, because a phenol resin has a high carbon residue content after thermal decomposition (carbonization) as high as 25% or more, when a molded article containing a phenol resin is used as a casting mold, it forms a carbonized film to provide a casting with an improved casting surface. Usable phenol resins include novolak phenol resins requiring a curing agent and resol type phenol resins requiring no curing agent. In using a novolak phenol resin, a curing agent is required. Since the curing agent easily dissolves in water, it is preferably applied to the surface of a molded article after dewatering. The curing agent preferably includes hexamethylenetetramine. The thermosetting resins can be used either individually or as a combination of two or more thereof.

The heat expandable particles preferably include microcapsules having a blowing agent that vaporizes and expands encapsulated in a thermoplastic resin capsule wall. It is preferred that the microcapsules have an average particle size of 5 to 80 μm, more preferably 20 to 50 μm, and, on being heated to 80° to 200° C., expand to increase preferably to 3 to 5 times in diameter and 50 to 100 times in volume.

The thermoplastic resin constituting the capsule wall of the microcapsules includes polystyrene, polyethylene, polypropylene, polyacrylonitrile, acrylonitrile-vinylidene chloride copolymers, ethylene-vinyl acetate copolymers, and mixtures thereof. The blowing agent to be encapsulated includes low-boiling organic solvents, such as propane, butane, pentane, isobutane, and petroleum ether.

In addition to the aforementioned components, the molded article of the present embodiment can contain other components in appropriate ratios. The other components include strengthening agents, such as polyvinyl alcohol, carboxymethyl cellulose (CMC), and a polyamideamine-epichlorohydrin resin, flocculants, and colorants.

When the molded article according to the present embodiment is prepared using a slurry containing water, the water content of the molded article before use (i.e., before use as a casting mold) is preferably 8% or less, more preferably 3% or less. A smaller water content causes less gas generation attributed to thermal decomposition (carbonization) of the thermosetting resin on pouring molten metal.

The molded article of the present embodiment may have an appropriate thickness according to the use. A preferred thickness is 0.2 to 5 mm. A more preferred thickness is 0.7 to 1.5 mm. Within the above preferred thickness range, the strength is secured sufficiently while minimizing the influences of the expansion of the heat expandable particles on the molding properties, and gas generation on pouring is suppressed.

The method of producing a molded article according to the present invention will then be described with particular reference to the production of the molded article according to the above-described embodiment.

Figure 2:
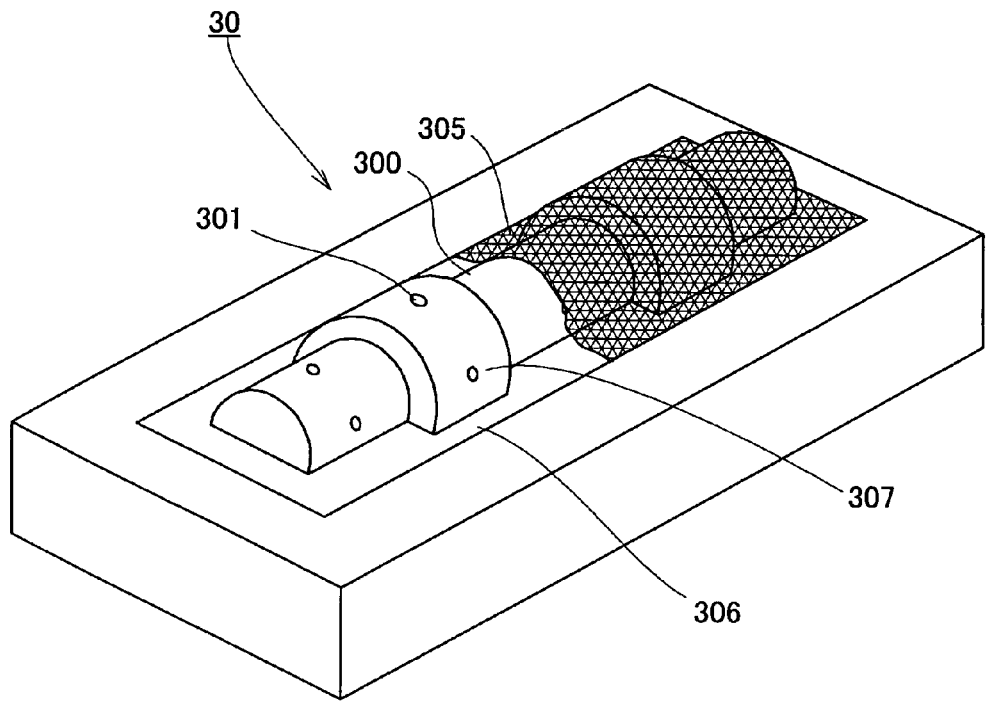
FIG. 2 is a perspective schematically illustrating an embodiment of a papermaking mold used in the present invention, with part cut away.
Figure 3:
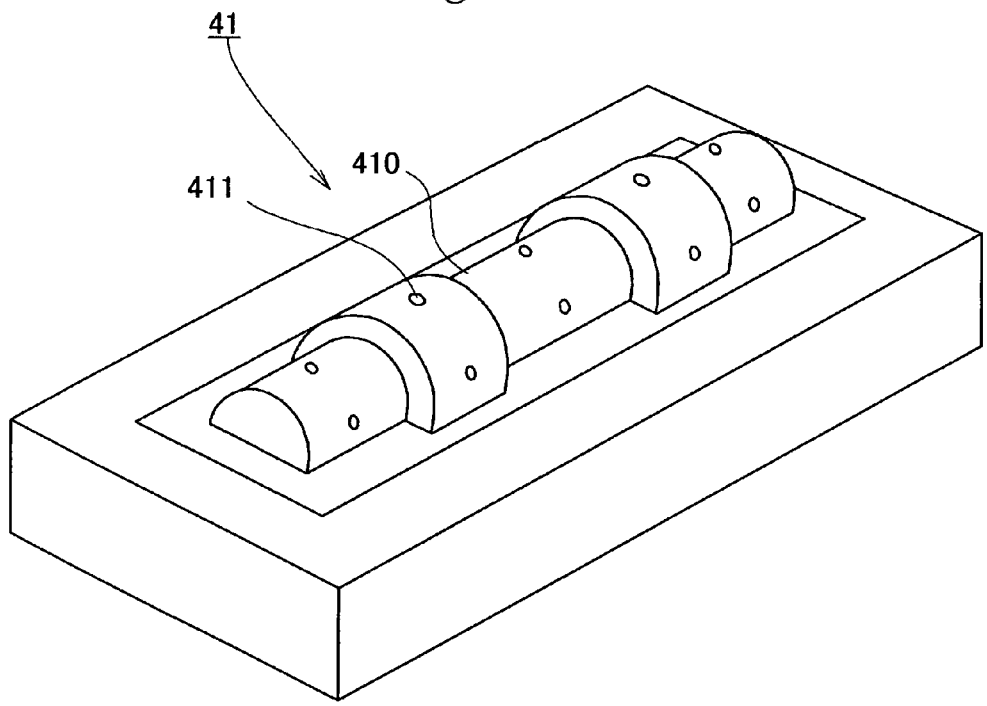
FIG. 3 is a perspective schematically illustrating a male mold of a drying and shaping means of the apparatus.

FIGS. 1 to 3 provide schematic illustrations of an embodiment of a production apparatus used to carry out the method of producing a molded article according to the present invention. In these figures numeral 1 indicates the apparatus.

As shown in FIG. 1, the apparatus 1 is configured to produce a semicylindrical molded article 11 having a flange 111 around its opening (see FIG. 10). The apparatus 1 has a stock feed means 2 for feeding a stock slurry, a papermaking means 3 where the slurry from the stock feed means 2 is converted into a wet preform (or a precursor), and a drying/shaping means 4 where the preform is dried and shaped. A pair of the semicylindrical molded articles 11 are mated together to form a cavity.

The stock feed means 2 has a pouring frame 20, a vertically moving mechanism 21 for vertically moving the pouring frame 20, and a slurry feed pipe 22 for feeding the stock slurry into the pouring frame 20. The stock feed pipe 22 has a valve 23.

The papermaking means 3 has a papermaking mold 30 serving like a male mold. The papermaking mold 30 has a wire part 300 corresponding to the shape of a preform to be formed. The wire part 300 has gas/liquid passageways 301 (see FIG. 2) open on the surface thereof, piercing the inside thereof, and connected to a drainage pipe 303 leading to a suction pump 302. The drainage pipe 303 has a valve 304. The wire part 300 has a papermaking wire 305 disposed on the surface thereof.

As illustrated in FIGS. 1 to 3, the drying/shaping means 4 has a female mold 40 and a male mold 41. On being butted together, the female mold 40 and the male mold 41 makes a clearance therebetween defining the outer contour of a molded article to be produced. The female mold 40 has a concave forming part 400 defining the exterior contour of the molded article 11 to be produced. The female mold 40 is equipped with a heater (heating means) 401 for heating the forming part 400. The female mold 40 is vertically movable by a vertical moving means 402. The female mold 40 has gas/liquid passageways (not shown) open on the surface of the forming part 400 and piercing the inside thereof. The gas/liquid passageways connect to a flow pipe 403 leading to a suction pump and a compressor (both not shown). The flow pipe 403 has a valve 404. The male mold 41 has a convex forming part 410 shaped to the interior contour of the molded article 11. The forming part 410 has gas/liquid passageways 411 (see FIG. 3) open on the surface thereof, piercing the inside thereof, and connecting to a drainage pipe 413 leading to a suction pump 412. The drainage pipe 413 has a valve 414. While not shown, a heater (heating means) for heating the forming part 410 is provided inside the forming part 410. The forming parts 400 and 410 desirably have their surface coated with a fluororesin.

The apparatus 1 has a transfer means (not shown) that moves the papermaking mold 30 and the male mold 41 along a guide 50 to the respective predetermined positions. The apparatus 1 also has a control means (not shown) having a sequencer connected to each of the above-mentioned means whereby to operate the means in accordance with the sequence described hereunder.

The method of producing a molded article by use of the apparatus 1 will then be described with reference to FIGS. 4 through 10(b). In these figures numeral 10 indicates a preform, and numeral 11 indicates a molded article.

The method of producing a molded article according to the aforementioned embodiment begins with the preparation of a stock slurry by dispersing the above-described inorganic powder, inorganic fiber, organic fiber, thermosetting resin, and heat expandable particles in a dispersing medium. The slurry should be formulated as appropriate for a molded article to be produced, such as the one described above.

The dispersing medium includes water, white water, a solvent such as ethanol or methanol, and mixtures thereof. Water is preferred in view of stability in papermaking, dewatering, and shaping, stability of the molded article quality, cost, ease of handling, and the like.

Figure 4:
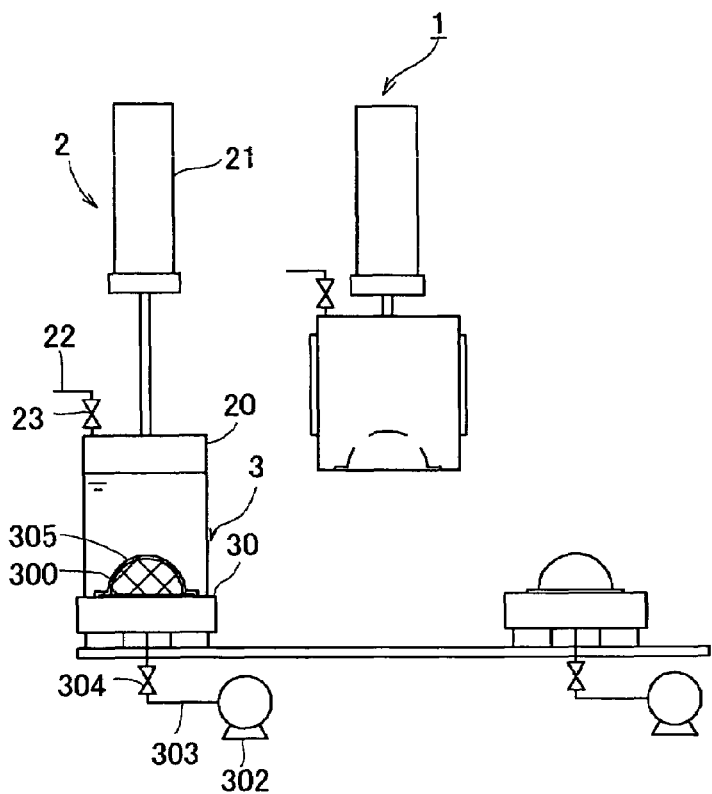
FIG. 4 schematically illustrates the step of papermaking in an embodiment of the method of producing a molded article according to the present invention.

A wet preform 10 (see FIG. 8) is formed from the prepared slurry by papermaking processing. In the step of papermaking, the vertically moving mechanism 21 operates to lower the pouring frame 20, and the valve 23 opens to supply the slurry through the slurry feed pipe 22 into the pouring frame 20 as shown in FIG. 4. When the slurry in the pouring frame 20 reaches a prescribed amount, the valve 23 closes to stop the slurry feed. The valve 304 opens, and the liquid matter of the slurry is sucked by the suction pump 302 through the gas/liquid passageways 301 and the drainage pipe 303. Meanwhile the solid matter of the slurry is deposited on the surface of the wire 305 to build up a wet preform 10. The liquid content of the preform 10 is preferably 50 to 300 parts by mass, more preferably 70 to 200 parts by mass, per 100 parts by mass of the solids content of the preform 10 taking into consideration ease of handling the preform 10 and deformability of the preform 10 due to flow of the fibers while pressed between the female mold 40 and the male mold 41 (deformation to some extent by the pressing is desirable). The liquid content can be adjusted by the suction of the liquid matter with the suction pump 302. When the liquid content decreases to a predetermined level, the suction is stopped.

Figure 5:
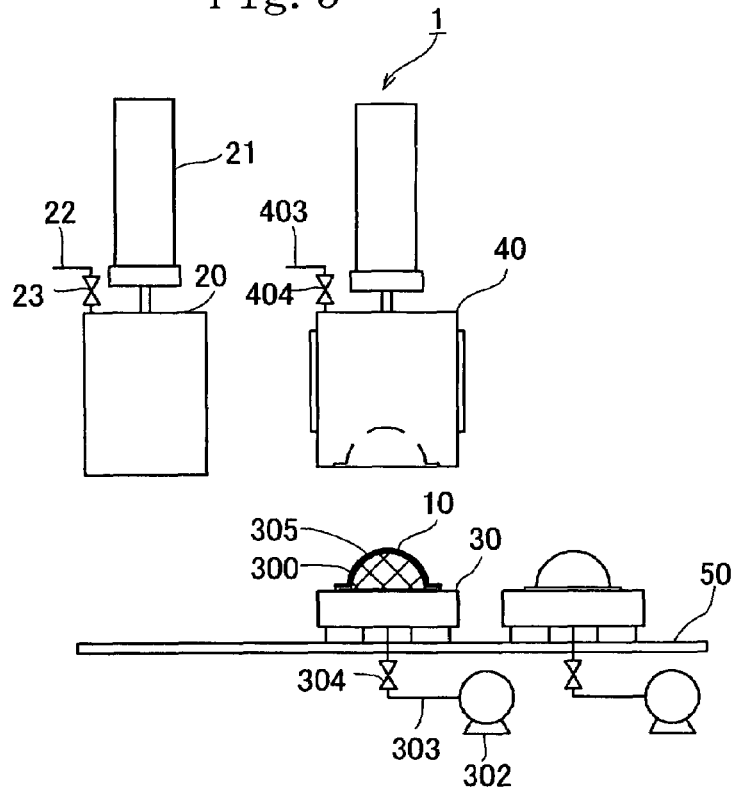
FIG. 5 schematically illustrates the step of transferring a preform after completion of the step of papermaking in the embodiment of the method of producing a molded article according to the present invention.
Figure 6:
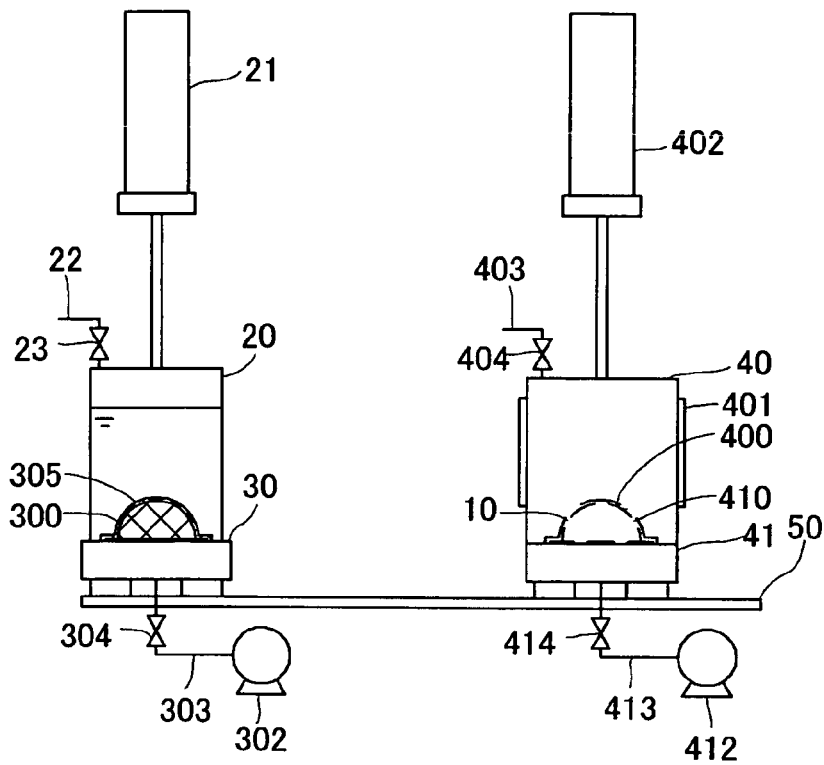
FIG. 6 schematically illustrates the step of drying and shaping in the embodiment of the method of producing a molded article according to the present invention.
Figure 8:
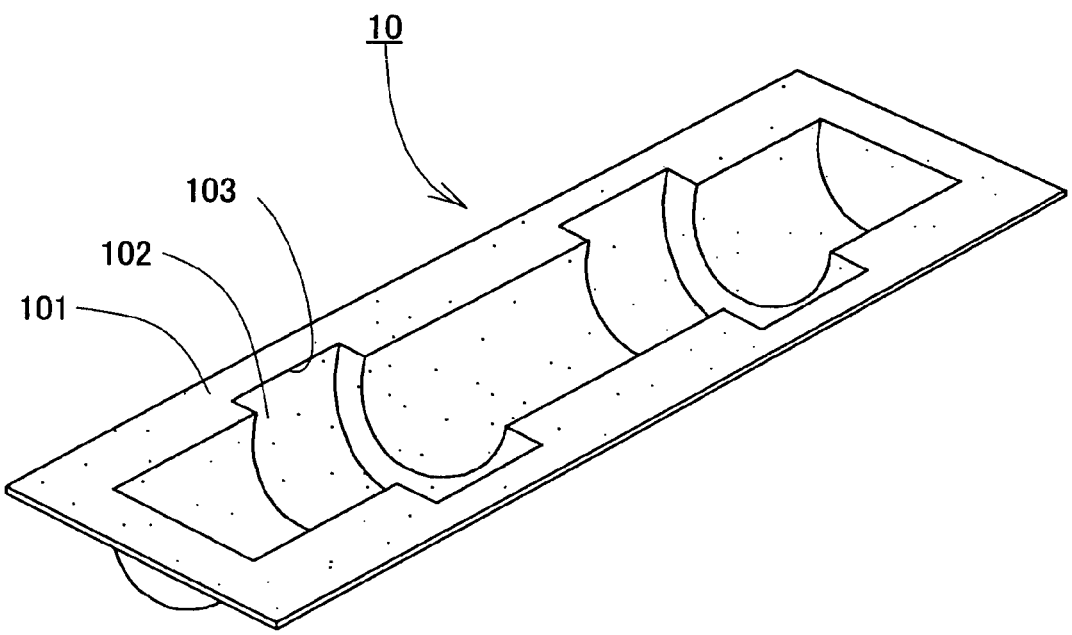
FIG. 8 is a perspective of an example of a preform prepared by the method of producing a molded article according to the present invention.

After completion of the formation of the preform 10, the vertically moving mechanism 21 lifts the pouring frame 20, and the transfer means operates to transfer the papermaking mold 30 to under the female mold 40 along the guide 50 as shown in FIG. 5. In this way, the preform 10 shown in FIG. 8 is obtained, which has an opening, a flange 101 around the perimeter of the opening, and a cavity wall 102, the flange 101 and the cavity wall 102 meeting to form an edge 103.

The female mold 40 is then lowered and joined with the papermaking mold 30 by the vertically moving mechanism 402. The preform 10 is sucked toward the forming part 400 through the flow pipe 403 of the female mold 40. The female mold 40 is moved up by the vertically moving mechanism 402 whereby the preform 10 is transferred from the papermaking mold to the female mold 40. The female mold 40 is then moved to the position for drying and shaping with the male mold 41 illustrated in FIG. 6.

Figure 9:
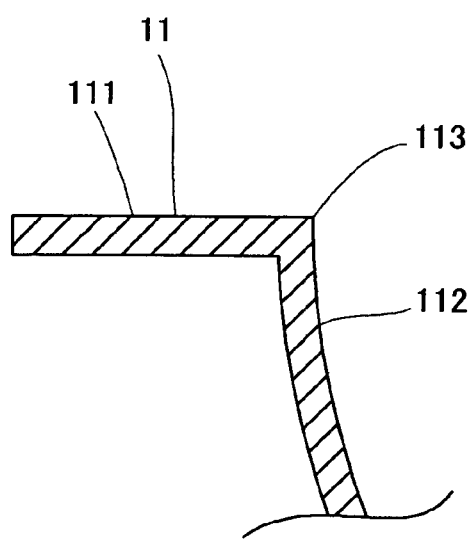
FIG. 9 is an enlarged cross-section of an edge of a molded article obtained after the step of drying and shaping according to an embodiment of the present invention.

Next, the preform is heated in a shaping mold and thereby dried and shaped while expanding the heat expandable particles. In this drying step, the vertically moving mechanism 402 operates to lower the female mold 40 (a half of the shaping mold) to mate the female mold 40 with the male mold 41 (the other half of the shaping mold) heated to a prescribed temperature. The preform 10 is pressed between the male and female molds, and the heat expandable particles expand with the progress of drying/shaping to give a heat-dried molded article 11. The expansion of the heat expandable particles with the progress of drying/shaping brings about improved precision of shape transfer to a molded article. As a result, the edge 113 of the molded article 11 where the flange 111 and the cavity wall 112 meet becomes sharp as illustrated in FIG. 9. Additionally, the resulting molded article 11 has excellent surface smoothness even on its vertical regions (e.g., 114 and 115 in FIG. 10(a)) that are difficult to exert a sufficient pressing force by merely butting the female mold (a half of the shaping mol) 40 and the male mold (the other half of the shaping mold) 41.

The mold temperature (the temperature of the female mold 40 and the male mold 41) is decided as appropriate to the molded article to be produced. To avoid scorching of the preform 10, the mold temperature is preferably 100° to 250° C., more preferably 120° to 200° C. The pressing pressure by the female mold 40 and the male mold 41 is preferably 0.2 to 10 MPa, more preferably 0.5 to 5 MPa, taking it into consideration that any thick-walled part should be leveled and the like. Note that the pressing pressure can largely deviate from the above range depending on the material making the molded article, the strength, and the like.

During the drying and shaping, the valve 414 is open, and the water content of the preform 10 is sucked by the suction pump 412 through the gas/liquid passageways 411 (see FIG. 3) and the drainage pipe 413 and discharged outside. On the other hand, the vertically moving mechanism 21 operates to lower the pouring frame 20 to have the wire part 301 of the papermaking mold 30 enclosed in the pouring frame 20, and another preform is formed in the same manner as in the above-described papermaking step.

Figure 7:
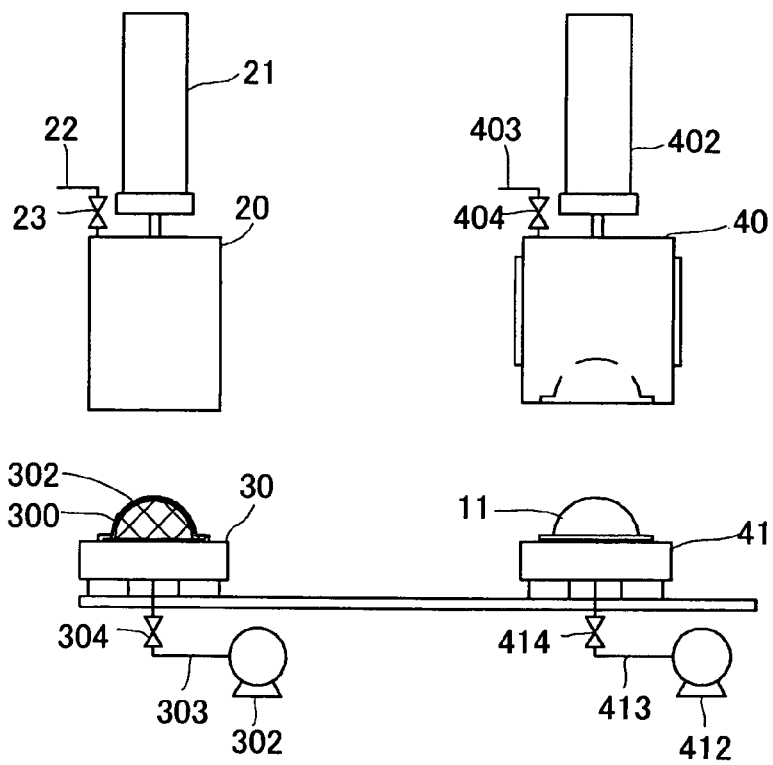
FIG. 7 schematically illustrates release from the mold after completion of the step of drying and shaping in the embodiment of the method of producing a molded article according to the present invention.

On completion of the drying/shaping step, the suction through the flow pipe 403 is switched to blowing air from the compressor, and the vertically moving mechanism 402 lifts the female mold 40 as illustrated in FIG. 7. The suction by the suction pump 412 is stopped, and the molded article 11 left on the male mold 41 is removed. A cycle of production of the molded article 11 thus completes. Meanwhile the pouring frame 20 is moved up by the vertically moving mechanism 21, and the next preform 10 is then transferred to the step of heating. In the method of the present embodiment, the above-described steps of papermaking and drying/shaping are repeatedly carried out.

Figure 10A:
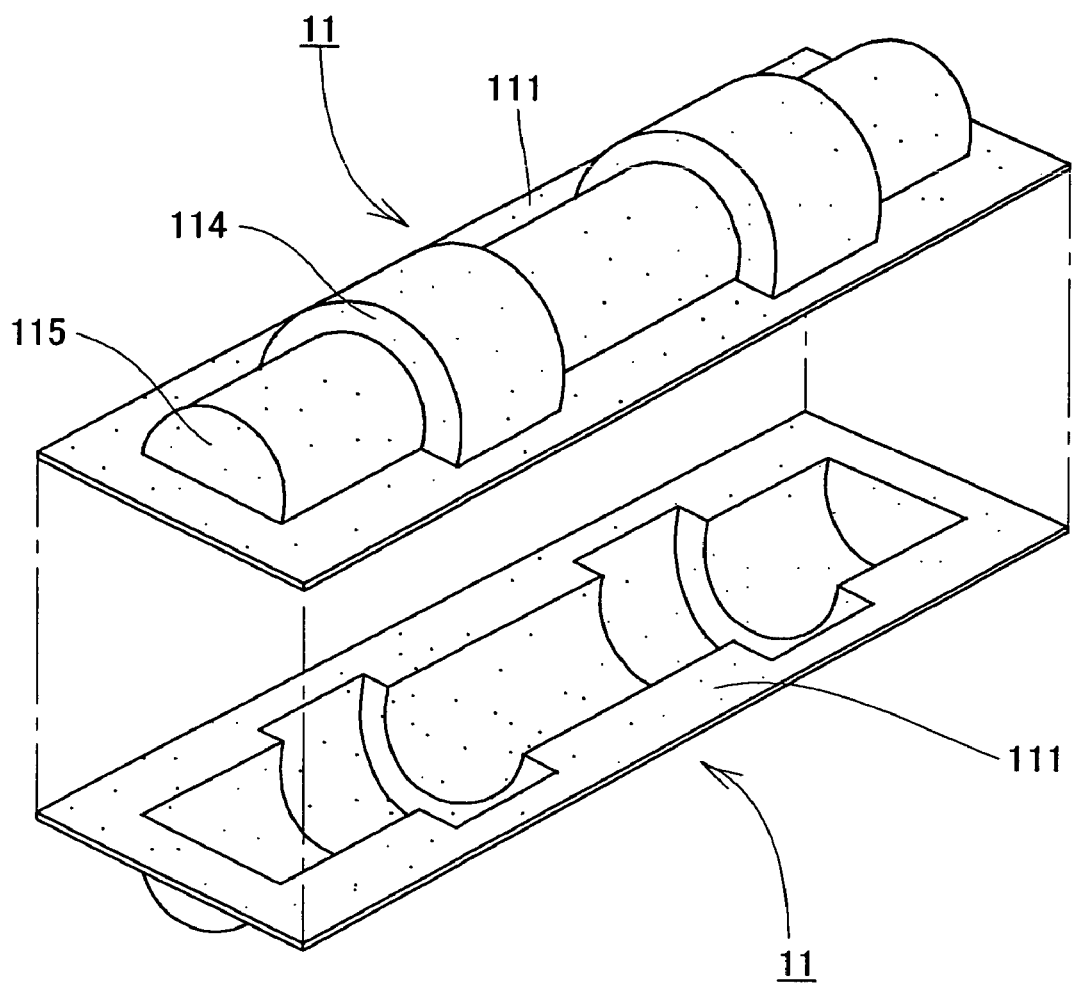
FIG. 10(*a*) illustrates exemplary molded articles produced by the method of producing a molded article according to the present invention and shows two molded articles being mated with each other.
Figure 10B:
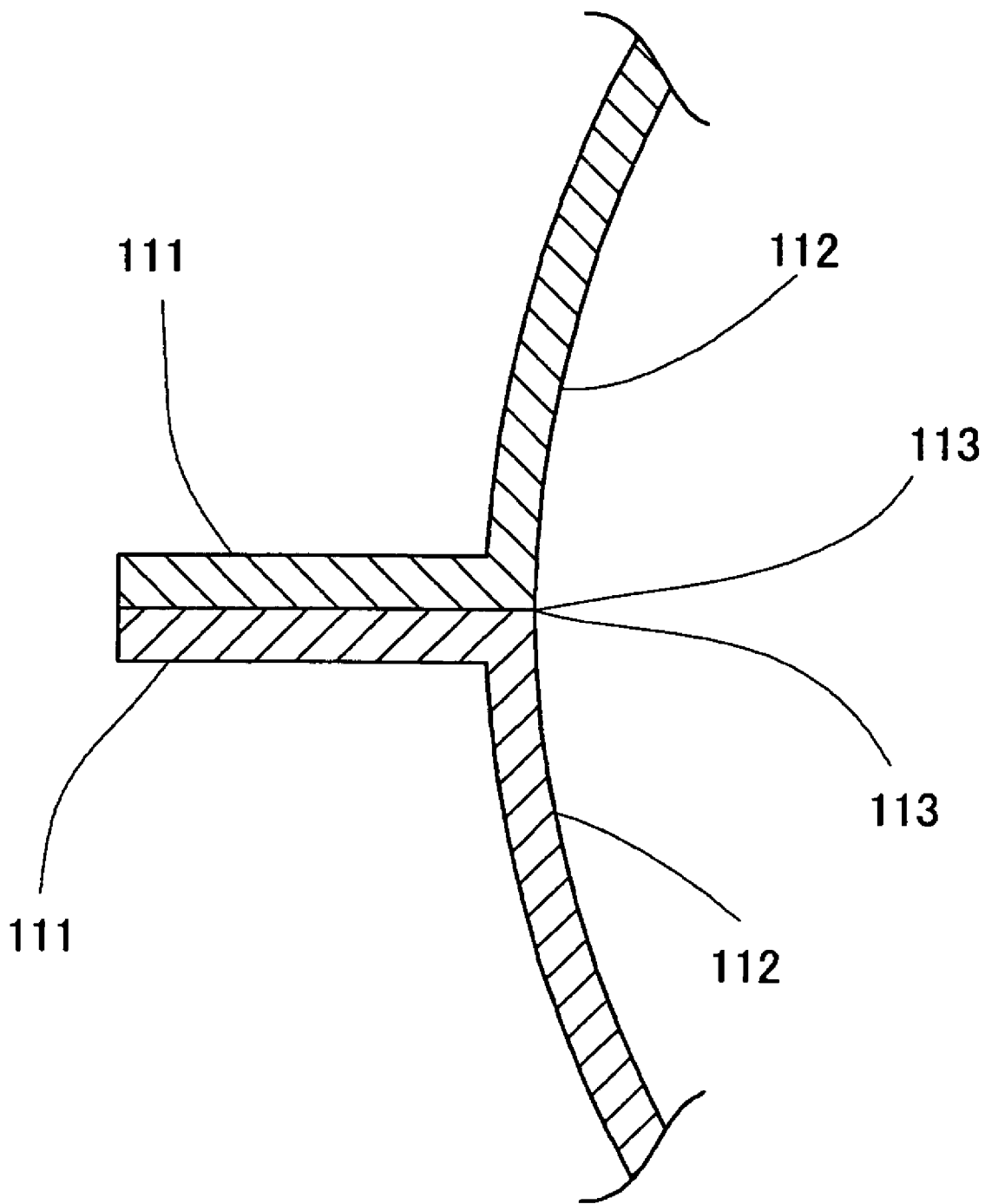

When two of the thus produced molded articles 11 are mated with their flanges 111 butted together as illustrated in FIG. 10(a), substantially no gap is formed along the parting line where the edges of the two molded articles meet as illustrated in FIG. 10(b) because of their sharp-cut edges 113. Therefore, where the two molded articles are joined to make, for example, a casting mold having a cavity, in which molten metal is poured, a flashless casting can be obtained.

The resulting molded article may be partially or entirely impregnated with the above-described thermosetting resin according to necessity. After the impregnation, the impregnated molded article is dried by heating to thermally cure the thermosetting resin, if necessary, followed by trimming, cutting or like machining to make a final molded article.

The molded article thus obtained contains the inorganic powder as a main component and further contains the inorganic fiber, organic fiber, thermosetting resin, and heat expandable particles. Since the heat expandable particles in the preform s expand to fill voids in every corner of the preform in the drying/shaping step, the molded article shows high molding precision in detail even if the shape is complicated.

In addition to the molding properties described above, the molded article has excellent surface smoothness, which can be maintained during a pour. Therefore, the molded article, when used as a casting mold, provides a casting with improved surface smoothness. In particular, burn-on after pouring is greatly reduced without the aid of a parting agent as has been applied to conventional casting molds, so that casting can be achieved through a reduced number of processing steps.

The molded article being excellent in high-temperature strength and shape retention during a pour, use of the molded article in casting eliminates the necessity to harden casting sand with a binder in making a casting mold. It follows that the spent sand needs no mechanical polishing for reclamation, which greatly reduces the waste from casting. When the molded article is used as a core to make a hollow part of a casting, the core does not always need to be filled with sand.

Furthermore, the molded article after casting can easily be removed so that the casting mold, etc. are easier to remove than before. The molded article, being light-weight, is easy to handle.

In the method of the present embodiment, since the molded article is produced by a papermaking technique using a stock slurry containing the above-described components, a casting mold, etc. having the components uniformly dispersed therein can be obtained. Therefore, the casting mold has reduced occurrence of troubles such as cracking with thermal shrinkage, exhibits excellent high-temperature strength, surface smoothness, molding precision, and mechanical strength, and provides a casting having high surface smoothness with good casting precision.

While the organic fiber burns by the heat of molten metal to form voids inside the casting mold, the strength of the mold is maintained by the inorganic powder, inorganic fiber, thermosetting resin, and heat expandable particles. After the casting mold is broken, the molded article is easily be separated and removed from sand by blasting or the like. In other words, the molded article according to the present invention, which contains the inorganic powder, inorganic fiber, organic fiber, thermosetting resin, and heat expandable particles, retains its strength when it is assembled into a casting mold and during a pour and has reduced strength after the casting mold is broken. In making a casting by use of the molded article of the invention, the waste is easier and therefore less costly to dispose of, and the amount of the waste itself is reduced than in a conventional system.

The molded article of the invention is light-weight and easy to cut with a simple tool and therefore easy to handle.

The present invention is not construed as being limited to the aforementioned embodiments but is subject to variation as appropriate without departing from the spirit and scope of the invention.

The molded article of the invention is suitable for use as not only a casting mold part (i.e., a main mold and a core) but also structures, such as a runner, a wall, a pouring cup, a sprue, a choke, a gate, a vent, a flow-off, and a feeder, and other auxiliary structures used in casting. The molded article of the invention is also applicable to other fields demanding heat resistance in addition to the field of casting, enjoying high molding precision in every corner of its shape as designed for the application.

EXAMPLES

The present invention will now be illustrated in greater detail with reference to Examples, but it should be understood that the invention is not limited thereto.

Example 1

A molded article was produced from a stock slurry having the formulation described below. A casting was produced using the resulting molded articles as a casting mold (main mold). The resulting casting was evaluated with respect to shape transfer, flash, and metal penetration as follows. The results are shown in Table 1. As previously stated, "flash" is a casting defect that occurs, in producing a casting by pouring molten metal into a casting mold assembled by joining two molded articles, when the molten metal enters a gap between the parting faces of the molded articles and solidifies as such. "Metal penetration" is a casting defect that occurs when molten metal enters a crack or a void on the cavity surface of a casting mold and solidifies as such.

Preparation of stock slurry

The inorganic powder, inorganic fiber, organic fiber, and heat expandable particles shown below were dispersed in water to prepare a slurry having a concentration of about 1% (a total concentration by mass of the inorganic powder, inorganic fiber, organic fiber, and heat expandable particles based on water). The thermosetting resin and flocculant were added to the slurry to prepare a stock slurry containing the inorganic powder, inorganic fiber, organic fiber, thermosetting resin, and heat expandable particles in the compounding ratio (by mass) below.

Formulation of Stock Slurry

Inorganic powder: tabular graphite(scaly graphite)

Inorganic fiber: PAN carbon fiber (Torayca Chopped (trade name) available from Toray Industries, Inc.; length: 3 mm; percent shrinkage: 0.1%)

Organic fiber: paper fiber (recycled newspaper; average length: 1 mm; freeness (CSF): 150 cc)

Heat expandable particles: heat expandable microcapsules (Matsumoto Microsphere F-793D (trade name) from Matsumoto Yushi-Seiyaku Co., Ltd.)

Thermosetting resin: phenol resin (S890 from Air Water Bell-pearl, Inc.)

Compounding Ratio (%): inorganic powder/inorganic fiber/organic fiber/thermosetting resin/heat expandable particles=78/4/4/12/2

Dispersing medium: water

Formation of Preform

A preform was formed using the stock slurry prepared above and a papermaking mold (of the same configuration as illustrated in FIG. 2) in accordance with the procedure of the above-described embodiment. The preform had a thickness of 1 mm to 3 mm.

Drying/Shaping of Preform

The resulting preform was placed on a shaping mold having its forming surface coated with a fluororesin and dried and shaped under the following conditions to prepare a molded article.

Press-forming pressure: 3.8 MPa
Drying mold temperature: 180° C.

Evaluation of Shape Transfer

The resulting casting was observed with the naked eye. The shape transfer on the surface of the casting was rated on the following scale.

A: The shape of the mold is faithfully reproduced.
A–: Part of the shape of the mold is not transferred to result in surface unevenness, which is repairable by post-casting treatment.
B: The shape of the mold fails to be transferred beyond repairability by post-casting treatment.

Evaluation of Flash

The casting was observed with the naked eye. The length of the flash was measured with a slide caliper, etc. to rate the flash either "A" or "B":

A: A little flash is observed on part of the casting, but its length is not longer than 1 mm.
B: The length of the flash on the casting exceeds 1 mm.

Evaluation of Metal Penetration

The casting was observed with the naked eye to rate occurrence of metal penetration either "A" or "B":

A: The shape of the mold is faithfully reproduced all over the casting.
B: Metal penetration caused by penetration of molten metal into the mold during a pour is observed on part of the surface of the casting.

Results

The curvature radius (R) at the edges of the molded article was in a range of about 0.1 to 0.2 mm, indicating that the molded article had sharp edges. Two of the molded articles were mated to form a cavity and buried in sand. Molten metal was poured into the cavity to achieve casting. As shown in Table 1, the casting obtained by using the molded articles of Example 1 displayed satisfactory results in shape transfer, reduction of flash, and reduction of metal penetration. The casting was particularly excellent in that the flash along the whole parting line was 1 mm or shorter.

Example 2

Molded articles were produced in the same manner as in Example 1, except for altering the formulation of the stock slurry and the drying/shaping conditions of the preform as described below. A casting was produced using the resulting molded articles as a main mold. The resulting casting was evaluated in the same manner as in Example 1. The results obtained are shown in Table 1.

Formulation of Stock Slurry

Inorganic powder: tabular graphite (scaly graphite)

Inorganic fiber: PAN carbon fiber (Pyrofil (trade name) available from Mitsubishi Rayon Co., Ltd.; length: 3 mm; percent shrinkage: 0.1%)

Organic fiber: paper fiber (recycled newspaper; average length: 1 mm; freeness (CSF): 150 cc)

Heat expandable particles: heat expandable microcapsules (Matsumoto Microsphere F-105D (trade name) from Matsumoto Yushi-Seiyaku Co., Ltd.)

Thermosetting resin: phenol resin (S890 from Air Water Bell-pearl, Inc.)

Compounding Ratio (%): inorganic powder/inorganic fiber/organic fiber/thermosetting resin/heat expandable particles=76/4/4/12/4

Dispersing medium: water

Drying/Shaping of Preform

The resulting preform was placed in a shaping mold having the inner surface coated with a fluororesin and dried and shaped under the following conditions to obtain a molded article.

Press forming pressure: 3.8 MPa
Drying mold temperature: 200° C.

Results

The curvature radius (R) at the edges of the molded articles was in a range of about 0.1 to 0.2 mm, indicating that the molded articles had sharp edges. The molded articles 11 had high surface smoothness even on their vertical regions 114 and 115, suffering from neither cracks nor holes. Two of the molded articles were mated to form a cavity and buried in sand. Molten metal was poured into the cavity to achieve casting. As shown in Table 1, the molded articles of Example 2 exhibited satisfactory results in shape transfer, reduction of flash, and reduction of metal penetration. The casting was particularly excellent in that the flash along the whole parting line was 1 mm or shorter.

Example 3

Molded articles were produced in the same manner as in Example 1, except for changing the formulation of the stock slurry as follows. A casting was produced using the resulting molded articles as a main mold. The resulting casting was evaluated in the same manner as in Example 1. The results obtained are shown in Table 1.

Formulation of Stock Slurry

Inorganic powder 1: tabular graphite (scaly graphite)

Inorganic powder 2: obsidian

Inorganic powder compounding ratio: tabular graphite (scaly graphite)/obsidian=50/50

Inorganic fiber: PAN carbon fiber (Pyrofil (trade name) available from Mitsubishi Rayon Co., Ltd.; length: 3 mm; percent shrinkage: 0.1%)

Organic fiber: paper fiber (recycled newspaper; average length: 1 mm; freeness (CSF): 150 cc)

Heat expandable particles: heat expandable microcapsules (Matsumoto Microsphere F-105D (trade name) from Matsumoto Yushi-Seiyaku Co., Ltd.)

Thermosetting resin: phenol resin (S890 from Air Water Bell-pearl, Inc.)

Compounding Ratio (%): inorganic powder/inorganic fiber/organic fiber/thermosetting resin/heat expandable particles=76/4/4/12/4

Dispersing medium: water

Results

The curvature radius (R) at the edges of the molded articles was in a range of about 0.1 to 0.2 mm, indicating that the molded articles had sharp edges. The molded articles 11 had high surface smoothness even on their vertical regions 114 and 115, suffering from neither cracks nor holes. Two of the molded articles were mated to form a cavity and buried in sand. Molten metal was poured into the cavity to achieve casting. As shown in Table 1, the molded articles of Example 3 exhibited satisfactory results in shape transfer, reduction of flash, and reduction of metal penetration. The casting was particularly excellent in that the flash along the whole parting line was 1 mm or shorter.

Example 4

Molded articles were produced in the same manner as in Example 1, except for changing the formulation of the stock slurry as follows. A casting was produced using the resulting molded articles as a main mold. The resulting casting was evaluated in the same manner as in Example 1. The results obtained are shown in Table 1.

Formulation of Stock Slurry

Inorganic powder 1: tabular graphite (scaly graphite)

Inorganic powder 2: mica

Inorganic powder compounding ratio: tabular graphite (scaly graphite)/mica=50/50

Inorganic fiber: PAN carbon fiber (Pyrofil (trade name) available from Mitsubishi Rayon Co., Ltd.; length: 3 mm; percent shrinkage: 0.1%)

Organic fiber: paper fiber (recycled newspaper; average length: 1 mm; freeness (CSF): 150 cc)

Heat expandable particles: heat expandable microcapsules (Matsumoto Microsphere F-105D (trade name) from Matsumoto Yushi-Seiyaku Co., Ltd.)

Thermosetting resin: phenol resin (S890 from Air Water Bellpearl, Inc.)

Compounding Ratio (%): inorganic powder/inorganic fiber/organic fiber/thermosetting resin/heat expandable particles=76/4/4/12/4

Dispersing medium: water

Results

The curvature radius (R) at the edges of the molded articles wasin a range of about 0.1 to 0.2 mm, indicating that the molded articles had sharp edges. The molded articles 11 had high surface smoothness even on their vertical regions 114 and 115, suffering from neither cracks nor holes. Two of the molded articles were mated to form a cavity and buried in sand. Molten metal was poured into the cavity to achieve casting. As shown in Table 1, the molded articles of Example 4 exhibited satisfactory results in shape transfer, reduction of flash, and reduction of metal penetration. The casting was particularly excellent in that the flash along the whole parting line was 1 mm or shorter.

Example 5

Molded articles were produced in the same manner as in Example 2, except for changing the amounts of the heat expandable particles and the inorganic powder to 6% and 74%, respectively. A casting was produced using the resulting molded articles as a main mold. The resulting casting was evaluated in the same manner as in Example 1. The results obtained were equal to those of Example 2.

Example 6

Molded articles were produced in the same manner as in Example 2, except for changing the amounts of the heat expandable particles and the inorganic powder to 8% and 72%, respectively. A casting was produced using the resulting molded articles as a main mold. The resulting casting was evaluated in the same manner as in Example 1. The results obtained were equal to those of Example 2.

Comparative Example 1

Molded articles were produced in the same manner as in Example 1, except for using a stock slurry having the following formulation that contained no heat expandable particles. A casting was produced using the resulting molded articles as a main mold. The resulting casting was evaluated in the same manner as in Example 1. The results obtained are shown in Table 1.

Formulation of Stock Slurry

Inorganic powder: tabular graphite (scaly graphite)

Inorganic fiber: PAN carbon fiber (Pyrofil (trade name) available from Mitsubishi Rayon Co., Ltd.; length: 3 mm; percent shrinkage: 0.1%)

Organic fiber: paper fiber (recycled newspaper; average length: 1 mm; freeness (CSF): 150 cc)

Thermosetting resin: phenol resin (S890 from Air Water Bellpearl, Inc.)

Compounding Ratio (%): inorganic powder/inorganic fiber/organic fiber/thermosetting resin=80/4/4/12

Dispersing medium: water

Results

The curvature radius (R) at the edges of the molded articles was measured. Although some edges had an R of about 0.1 to 0.2 mm, many of the edges had an R exceeding 1 mm. That is, the molded articles were less sharp at their edges than those of Examples. The vertical regions 114 and 115 of the molded articles 11 were found to have surface roughness due to pressure shortage and, in parts, suffered from a crack or a hole. Two of the molded articles were mated to form a cavity and buried in sand. Molten metal was poured into the cavity to carry out casting. As shown in Table 1, the combination of the molded articles of Comparative Example 1 failed to produce good results in shape transfer and reduction of flash and metal penetration. Flash exceeding 1 mm occurred at many sites along the parting line. The surface roughness of the vertical regions of the molded articles had been transferred to the casting, and molten metal penetration had occurred at the sites corresponding to the crack or hole. That is, the results indicate a failure to produce a non-defective product.

COMPARATIVE EXAMPLE 2

Molded articles were produced in the same manner as in Example 1, except for using a stock slurry having the following formulation that contained heat expandable particles in a proportion of 10% by mass or more based on the total amount of the inorganic powder, inorganic fiber, organic fiber, thermosetting resin and heat expandable particles. A casting was produced using the resulting molded articles as a main mold. The resulting casting was evaluated in the same manner as in Example 1. The results obtained are shown in Table 1.

Formulation of stock slurry

Inorganic powder: tabular graphite (scaly graphite)

Inorganic fiber: PAN carbon fiber (Pyrofil (trade name) available from Mitsubishi Rayon Co., Ltd.; length: 3 mm; percent shrinkage: 0.1%)

Organic fiber: paper fiber (recycled newspaper; average length: 1 mm; freeness (CSF): 150 cc)

Thermosetting resin: phenol resin (S890 from Air Water Bellpearl, Inc.)

Heat expandable particles: heat expandable microcapsules (Matsumoto Microsphere F-793D (trade name) from Matsumoto Yushi-Seiyaku Co., Ltd.)

Compounding Ratio (%): inorganic powder/inorganic fiber/organic fiber/thermosetting resin/heat expandable particles =70/4/4/10/12

Dispersing medium: water

Results

The curvature radius (R) at the edges of the molded articles was measured. The edges were as sharp as in Examples, having an R ranging from about 0.1 to 0.2 mm. The molded articles, however, suffered from surface unevenness in parts because the heat expandable particles continued expanding even after the molded article was removed from the mold. Two of the molded articles were mated to form a cavity and buried in sand. Molten metal was poured into the cavity to achieve casting. As shown in Table 1, the combination of the molded articles of Comparative Example 2 failed to produce good results in shape transfer. That is, the resulting casting was non-defective in that the flash along the whole parting line was within 1 mm but defective due to transfer of the surface unevenness of the molded articles.

TABLE 1

| | Ratio of Heat Expandable Particles (%)* | Inorganic Powder Kind | Ratio | Shape Transfer | Flash | Metal Penetration |
|---|---|---|---|---|---|---|
| Example 1 | 2 | tabular graphite (scaly graphite) | 100 | A | A | A |
| Example 2 | 4 | tabular graphite (scaly graphite) | 100 | A | A | A |
| Example 3 | 4 | tabular graphite (scaly graphite) obsidian | 50 50 | A | A | A |
| Example 4 | 4 | tabular graphite (scaly graphite) mica | 50 50 | A | A | A |
| Example 5 | 6 | tabular graphite (scaly graphite) | 100 | A | A | A |
| Example 6 | 8 | tabular graphite (scaly graphite) | 100 | A | A | A |
| Compara. Example 1 | 0 | tabular graphite (scaly graphite) | 100 | B | B | B |
| Compara. Example 2 | 12 | tabular graphite (scaly graphite) | 100 | B | A | A |

*Ratio of heat expandable particles (%) = mass of heat expandable particles/ (mass of inorganic powder + mass of inorganic fiber + mass of organic fiber + mass of thermosetting resin + mass of heat expandable particles)

INDUSTRIAL APPLICABILITY

The method of producing a molded article is especially suitable to produce a molded article for use as a casting mold. The method is also applicable to the production of other various molded articles having sharp edges, including containers, tools, and parts.

The invention claimed is:

1. A molded article comprising inorganic powder as a main component and further comprising inorganic fiber, organic fiber, a thermosetting resin, and heat expandable particles, the heat expandable particles being present in an amount of 0.5% to 10% by mass based on the total mass of the inorganic powder, the inorganic fiber, the organic fiber, the thermosetting resin, and the heat expandable particles and the inorganic powder being present in an amount of 70-80% by mass based on the total mass of the inorganic powder, the inorganic fiber, the organic fiber, the thermosetting resin, and the heat expandable particles.

2. The molded article according to claim 1, wherein the inorganic powder is graphite, the inorganic fiber is carbon fiber, the organic fiber is pulp fiber, and the thermosetting resin is a phenol resin.

3. The molded article according to claim 1, which is a casting mold.

4. The molded article according to claim 1, having a thickness of 0.2 to 5 mm.

5. The molded article according to claim 1, having at least one opening and a flange around the opening.

6. The molded article according to claim 1, which is a structure for the manufacture of a casting.

7. The molded article according to claim 6, wherein the structure is selected from the group consisting of a runner, a wall, a pouring cup, a sprue, a choke, a gate, a vent, a flow-off, and a feeder.

* * * * *

UNITED STATES PATENT AND TRADEMARK OFFICE
CERTIFICATE OF CORRECTION

PATENT NO. : 7,651,592 B2
APPLICATION NO. : 11/579955
DATED : January 26, 2010
INVENTOR(S) : Masayuki Osaki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 188 days.

Signed and Sealed this

Twenty-third Day of November, 2010

David J. Kappos
*Director of the United States Patent and Trademark Office*